United States Patent [19]

Schmiesing

[11] 3,774,943
[45] Nov. 27, 1973

[54] DRAW BAR HITCH
[76] Inventor: Gregory Schmiesing, R.R. No. 1, New Bremen, Ohio 45869
[22] Filed: Aug. 27, 1971
[21] Appl. No.: 175,445

[52] U.S. Cl............................ 280/479 R, 280/478 B
[51] Int. Cl............................ B60d 1/06, B60d 1/14
[58] Field of Search .................... 280/478 B, 479 R

[56] References Cited
UNITED STATES PATENTS
3,099,462  7/1963  Lent ............................... 280/478 B
3,521,908  7/1970  Carter ............................ 280/479 R
3,588,146  6/1971  Haddox ......................... 280/478 B FOREIGN PATENTS OR APPLICATIONS
460,956  1/1951  Italy .............................. 280/479 R Primary Examiner—Leo Friaglia
Attorney—Jerome P. Bloom

[57] ABSTRACT

A flexible bar mechanism in which a hitch means has alternative positions of adjustment relative to a fixed frame of reference. In a first or retracted position the hitch means seats interlockingly to a draw bar frame and forms a rigid part thereof. In a second the hitch means unseats relative to the draw bar frame and may assume varying attitudes to facilitate a required hitch. The invention provides for a smoothly effected movement of the hitch parts, whether to or from the draw bar frame, either manual or powered provision being made for disabling and restoring the wedged relationship of the parts.

13 Claims, 9 Drawing Figures

PATENTED NOV 27 1973 3,774,943
SHEET 1 OF 2
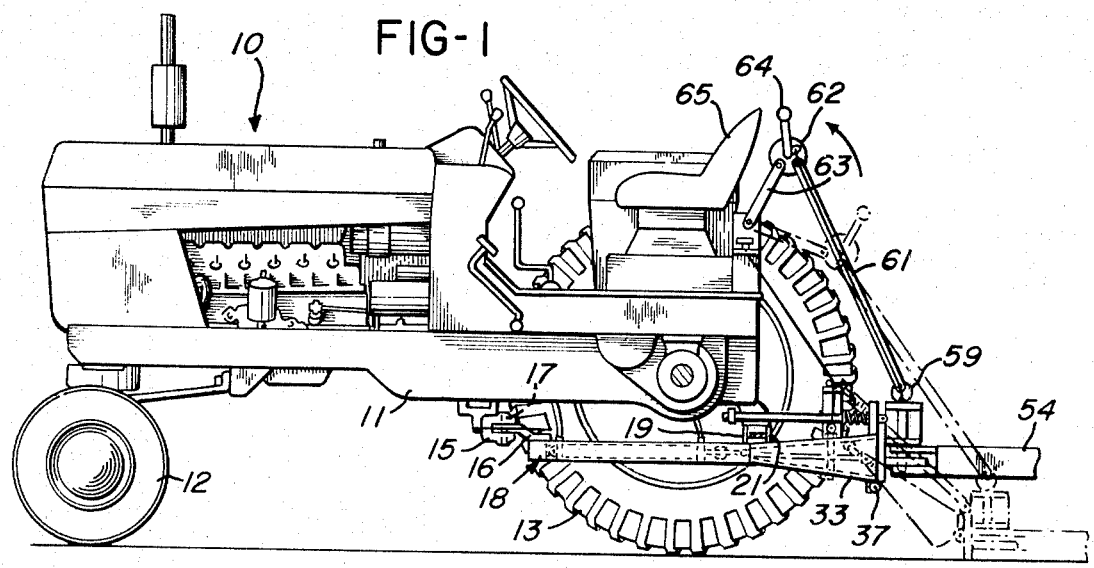
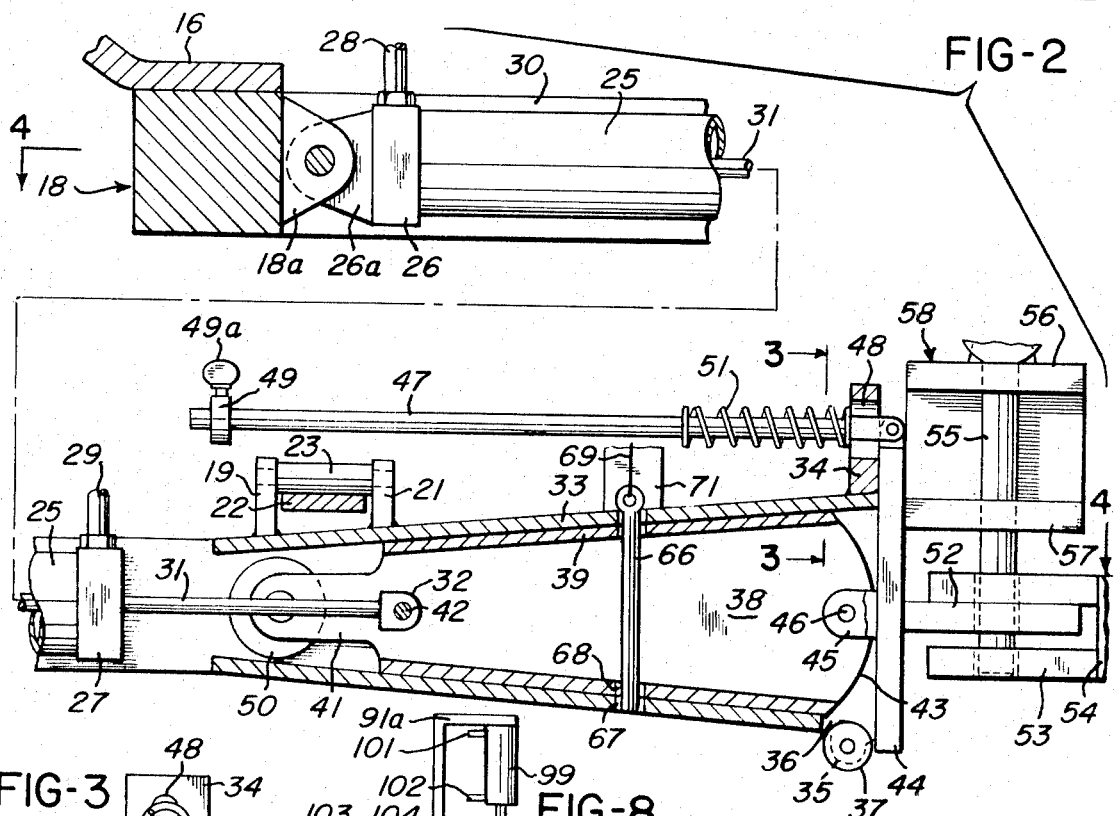
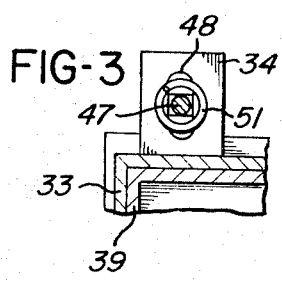
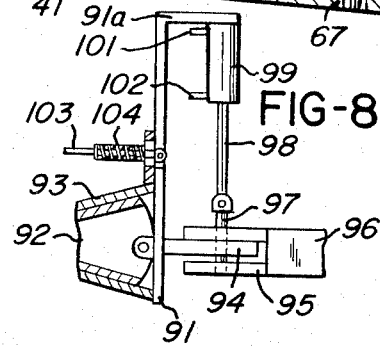
INVENTOR
GREGORY SCHMIESING
BY Jerome P. Bloom
ATTORNEY

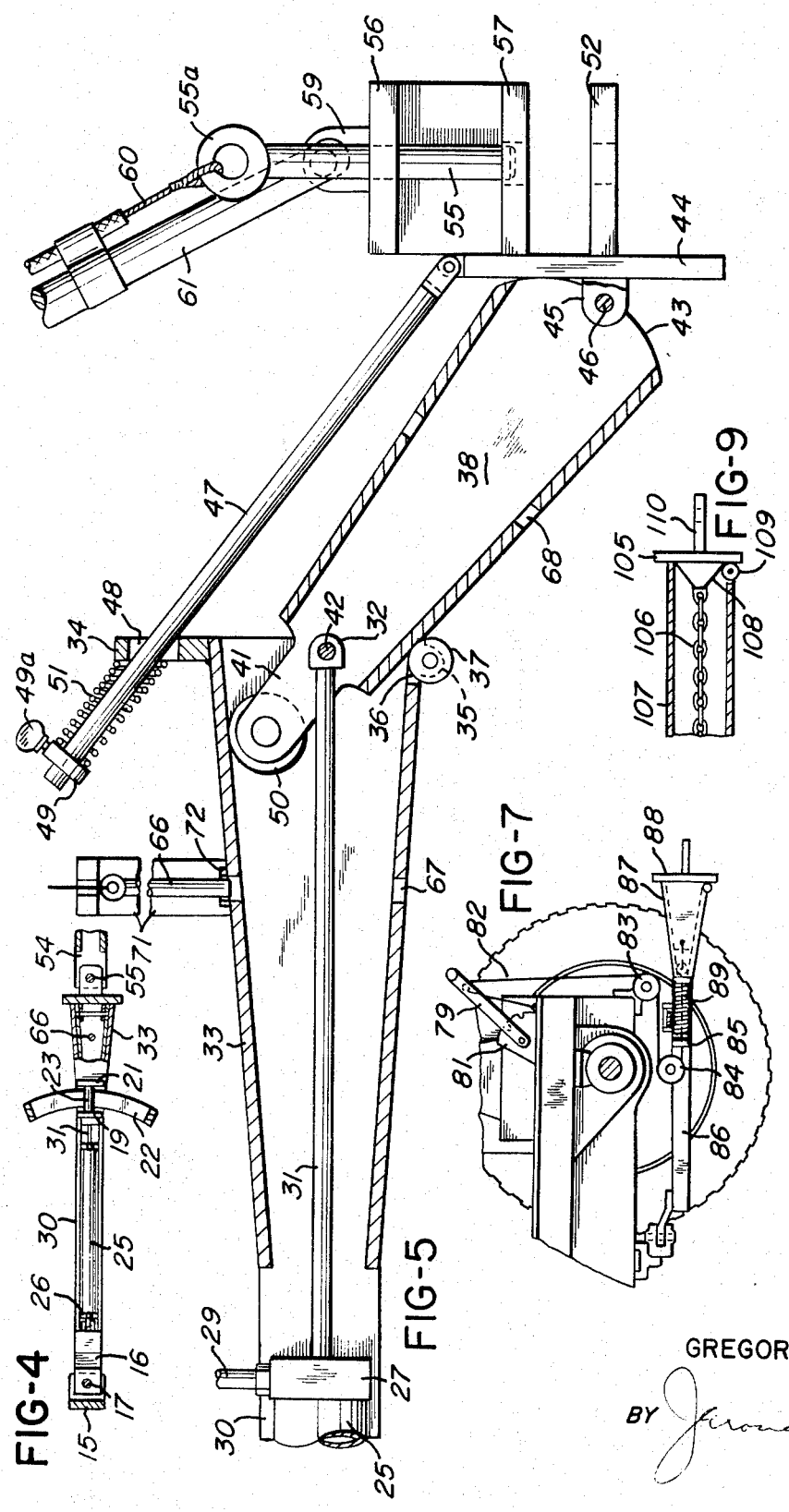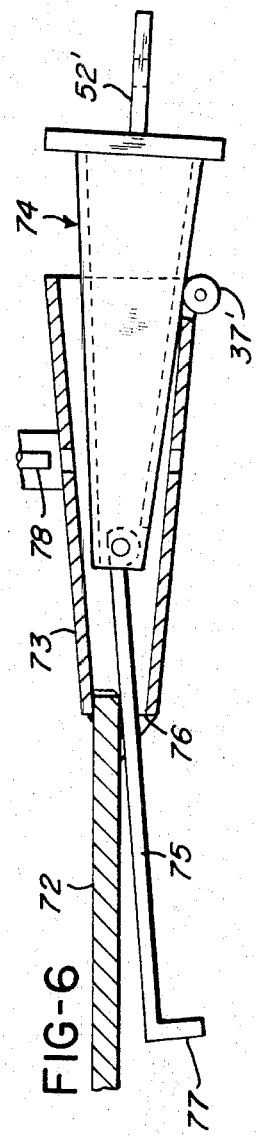

DRAW BAR HITCH

BACKGROUND OF THE INVENTION

This invention relates to draw bar mechanisms, particularly advantageous for use on farm tractors to couple thereto ground working and like implements. For purposes of illustration the invention embodiments will be so described.

It is desired for security purposes that draw bar apparatus form a relatively firm connection between a towing vehicle and the towed member and that there be insured a direct correspondence of the following movements of the towed member with respect to changing movements of the towing vehicle. Too much rigidity in the connection, as evidenced in many prior art draw bar devices, lessens flexibility and makes it difficult to effect a connection between the towing vehicle and the hitch-tongue on the towed member. For example, in use of prior art hitch devices of limited flexibility, it is necessary to make a straight line approach of the towing vehicle toward the towed member to specifically and precisely align the draw bar with the hitch-tongue. Since the draw bar normally occupies an underslung relation to the towing vehicle in a generally fixed plane parallel to ground surface while the hitch-tongue on the towed member may be at ground level or variably spaced above it, in prior art devices it is normally required that the hitch-tongue be manually lifted or lowered to agree with the height of the draw bar preparatory to completing the hitch. It has been known in the prior art to provide hitch connections which can be adjusted in permanent and semi-permanent respects. Prior to the present invention, however, it has not been known to incorporate the combined features of rigidity and flexibility which characterize the present invention.

SUMMARY OF THE INVENTION

In its illustrated forms the invention embodiments include a draw bar frame which mounts as a substantially rigid beam in an underslung relation to a tractor, to project from the rear thereof. Normally in a substantially wedging engagement with an outer end of the draw bar, to form a fixed part thereof in use, is a relatively extensible hitch means. When released from its wedging engagement in the draw bar, the invention hitch means is freely adjustable in plural senses and readily connected to a hitch-tongue, irrespective of whether the latter is resting at ground level, is elevated relative to the draw bar, or is otherwise misaligned. When a hitch is effected and the extensible hitch means retracteid, it once more automatically assumes a wedging engagement with the draw bar frame, achieving thereby the character of a device forming with the draw bar a substantially rigid link between the towing and the towed member. In accordance with the invention practice, powered or manual means may be employed to extend and to retract the flexible extensible hitch means. Accessory devices are also provided to selectively lock the hitch means to the draw bar, to stabilize a hitch plate at the outer end of the extensible hitch means, and to effect, by remote control, the coupling and uncoupling of the hitch means to a hitch-tongue.

A primary object of the invention is to provide a draw bar hitch construction which is economical to fabricate, more efficient and satisfactory in use and adaptable to a wide variety of applications.

Another object of the invention is to provide a draw bar mechanism in which a draw bar assembly is made rigid for effective towing of a towed member but incorporates independently adjustable hitch means for a simplified, rapid attachment of the towing to the towed member.

Another object of the invention is to utilize a principle of wedging between a complementary draw bar frame and separable hitch means to make possible its rigidity in towing and flexibility of attachment.

A further object of the invention is to provide a draw bar device for an automatically stabilizing hitch means. Still another object is to provide for remote actuation of a hitch pin carried by the hitch means.

Another object of the invention is to provide a draw bar type hitch construction possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

In the drawings:

FIG. 1 is a view in side elevation of a farm tractor embodying draw bar mechanism in accordance with an illustrated embodiment of the invention, an extended position of the hitch means being indicated in broken lines;

FIG. 2 is a fragmentary view in longitudinal section showing the draw bar mechanism as attached to a towed member and with its hitch means in a retracted position, as shown in full lines in FIG. 1;

FIG. 3 is a fragmentary view in transverse section, taken substantially along the line 3—3 of FIG. 2;

FIG. 4 is a fragmentary view, in transverse section taken along the line 4—4 of FIG. 2;

FIG. 5 is a view similar to that of FIG. 2 but showing the hitch means in a relatively extended position and detached from the towed device;

FIG. 6 is a view similar to FIG. 5 showing an alternate form of the invention embodiment including manual means for extending and retracting the hitch means;

FIG. 7 is a fragmentary detail view illustrating a modification of the invention using cable means for control of the hitch means;

FIG. 8 shows yet a further modification which utilizes a hydraulic remote control means for a hitch pin used in coupling the draw bar mechanism to a towed device; and FIG. 9 is a fragmentary view illustrating a simplified embodiment of the invention wherein the hitch means is controlled by a flexible chain.

Like parts are indicated by similar characters of reference throughout the several views.

As seen in the drawings, the invention is disclosed in application to a farm tractor 10 wherein it serves to facilitate the coupling thereto of farm working implements. As illustrated, the tractor 10 includes a chassis or frame 11 supported by front wheels 12 and rear wheels 13 in elevated relation to a ground surface 14. A bracket fixed to depend from a mid portion of the frame 11 mounts a clevis 15. Pivotally connected at one end by a pin 17 to the clevis 15 is a bracket 16 which has its opposite end suitably fixed, as by welding, to the innermost end of a draw bar frame 18. The latter positions below and longitudinally of the tractor frame 11 to extend beyond the rear of the tractor. It serves, as will be seen, as a means for support of a hitch device providing for the attachment of ground working and like implements which are to be pulled behind the tractor.

A pair of upstanding lugs 19 and 21 suitably secured at their lower ends to an intermediate portion of the draw bar frame 18 project above the frame to dispose respectively in front of and to the rear of a brace member 22 dependent from the tractor frame 11. The upper ends of lugs 19 and 21 are bridged by a transversely disposed pivot pin mounting a roller 23. As may be seen in FIGS. 2 and 4 of the drawings, the brace member 22 provides a track 24 for such roller, which track, as shown, has a relatively elongated arcuate configuration and gives the draw bar frame 18 a limited freedom of lateral swinging motion about the pivot pin 17. Accoridngly, lugs 19 and 21 provide, together with the roller 23, for an intermediate support of the draw bar frame and, in addition, provides, in conjunction with the brace member 22, for its guided lateral adjustment.

The section of frame 18 most adjacent the bracket 16 has an elongate rectangular box-like configuration and the top and bottom portions thereof are open to provide vertically aligned, longitudinally extended apertures. At its end immediately adjacent the bracket 16, the interior surface of this box-like formation has a transverse wall segment from which juts a bracket 18a. Disposing within this box-like portion of the frame 18 is a hydraulic cylinder 25 closed at its respective ends by caps 26 and 27. Through means of a horizontal pivot pin mounted on the bracket 18a and projected through and transversely of an ear 26a projected from the end cap 26, the cylinder 25 is pivotally connected at its innermost end to and within the bifurcations 30 of the frame 18. Hydraulic lines 28 and 29 respectively connected to open into the caps 26 and 27 communicate through suitable valve means with a source of hydraulic fluid (not shown). The cylinder 25 is of a conventional nature, having contained therein a piston to either side of which the cylinder is filled with hydraulic fluid. Under suitable valve control, fluid under pressure may be alternately moved to and from the cylinder by way of lines 28 and 29 to conventionally reciprocate the contained piston as and when needs require. The contained piston has in connection therewith a control rod 31 which projects outwardly of the cylinder through and in bearing relation to the end cap 27. Beyond the cap 27 the projected extremity of the rod 31 mounts a bifurcated lug 32. The projected extremity of the rod 31 and the lug 32 thereon is adapted to position beyond the portion of frame 18 of box-like configuration and within its outwardly flaring box-like end section 33. This projected section 33 of the frame 18 is formed to have divergent top and bottom wall sections bridged by further wall sections at their divergent level extremities. As may be seen in FIG. 2 of the drawings, the rearmost section 33 of the draw bar frame disposes in a rearwardly projecting relation to the tractor 10 and at its enlarged outer end the uppermost edge thereof has a perpendicularly projected flange segment 34 which is suitably fixed thereto. Welded to the bottom of the frame section 33 in substantially aligned relation to the flange segment 34 are tab means 35. The latter are transversely spaced to either side of a slot 36 formed in the bottom wall portion of the frame section 33 in the center of its rearmost edge. The tabs 35 are transversely bridged by a pin which pivotally supports a roller means 37 to orient the same to have its upper peripheral surface lie in a plane generally common to that of the inner surface of the bottom wall portion of the frame section 33.

The lug 32 within the draw bar frame section 33 receives therethrough a pivot pin 42. The latter is fixed to transversely bridge the interior of the innermost end of a tapered box-like hitch link member 38. The member 38 is open to either end and composed of divergent top and bottom wall portions bridged at their lateral extremities by side wall portions, the whole being so configured as to have its outer surface complementary to the inner surface of the draw bar frame section 33. Moreover, the member 38 is of a length and size that, on full retraction of the rod 31, it will seat firmly to the inner surface of the frame section 33 and be fully contained within its ends. Accordingly, in the projection and retraction of the rod 31 the device 38 will be projected from and retracted within the draw bar frame 18. In the latter case the seating will be substantially continuous over the outer surface of the member 37 and obviate motion thereof about its longitudinal axis. Thus, with respect to the member 38, the frame section 33 functions as a socket.

At its innermost reduced extremity and to the side of the rod 31 the member 38 includes a wall extension 41 of tongue form. The tongue 41 has a pin transverse to its inwardly projected extremity which rotatably mounts thereon a roller 50 the purpose of which will be further described. At its outermost end, each of the side walls of the member 38 have extensions 43 the projected extremities of which are arcuately curved on a uniform radius. Mounting transverse to the extensions 43 is a pin 46. It is noted that the pins 46 and 42 define a central plane of the member 38 which includes its longitudinal axis. The pin 46 lies immediately within the rearmost enlarged end of the frame section 33 and serves to pivotally mount the rearwardly projected ear 45 fixed perpendicular to an inner surface of a stabilizer plate 44. In its position shown in FIG. 2 of the drawings, the plate 44 is disposed in abutment with and in bridging relation to the enlarged opening from the rear end of the draw bar frame 18. So disposed, the upper edge of the bar 44 abuts the rearmost surface of the flange segment 34 and has an extension in line with an aperture 48 in such flange segment. A rod 47 extends at one end through the relatively enlarged aperture 48 to hingedly and pivotally connect to said upper extension of a stabilizer plate 44. Adjustably positioned on the rod 47 is a collar member 49 incorporating a set screw. The latter serves as a medium for the selected positioning of the member 49. Further mounted about the rod 47 is a short coiled spring 51 one end of which is adapted to abut the surface of flange 34 remote from that abutted in FIG. 2 by the stabilizer plate 44. The opposite end of the spring 51 is adapted for engagement by the collar 49 in a manner and for purposes to be further described.

At its outermost face, in line with its pivot mount, the stabilizer plate 44 has a perpendicularly projected ear 52 having a centrally positioned aperture in its outwardly projected extremity. The aperture in the ear 52 is in direct alignment with corresponding apertures in spaced apart bearing walls 56 and 57 forming parts of a bracket 58. The latter is rigidly mounted to the outer surface and to the upper end of the hitch plate 44, in spaced relation to the ear 52 as shown in FIG. 2. A hitch pin 55 is slidingly mounted in the bracket 58 to project through the aforementioned apertures in the walls 56 and 57 thereof and, in a hitching position, through the aperture in the ear 52. As may be seen in FIG. 2, prior to the projection of the hitch pin 55 through the ear 52, the latter is adapted to be inserted between the jaws of a clevis means 53 forming a hitching device connected with the implement or other device to be connected for towing by the tractor 10.

To one side of the hitch pin 55 the uppermost surface of the top wall 56 of the bracket 58 mounts a perpendicularly projected ear 59 to which one end of a link 61 is pivotally connected by suitable means. The link 61 has its upper and forwardly directed extremity pivotally connected to a disc 62. Pivotally connected by suitable universal means to a portion of the tractor chassis immediately adjacent the operator seat 65 is a link 63 the remote end of which is also pivotally connected to the disc 62. The respective connections of the links 61 and 63 to the disc 62 are to either side of its center to which is fixed a control handle 64. As may be seen, the operator on the seat 65 may achieve a pivotal swinging motion of the disc 62 through the medium of the handle 64 to selectively increase or decrease the spread between the links 61 and 63. Note that the upper end of the hitch pin 55 is provided with an integral loop 55a to which is connected the lowermost end of a control cable 60. The latter is guided in eyelets in connection with the link member 61 and spaced longitudinally thereof. The upper end of the cable 60 is also connected to the disc 62. As will be described, with the suitable control of the disc 62 the hitch pin 55 may be raised and lowered in reference to the bracket 58 and the interrelated ear 52 of the stabilizer plate 44. The link 61 in any case affords a direct connection between the stabilizer plate and the disc 62 under the control of the handle 64.

Let us now consider the use and function of the invention apparatus as was above described. As seen in FIG. 2, the invention apparatus is rigged in a towing position. In such instance the member 38 complementary to the draw bar frame section 33 is fully retracted within the socket provided by the frame, whereupon the stabilizer plate is perpendicularly positioned to bridge the rearwardly projected extremity of the draw bar frame 18. With the member 38 fully nested in the draw bar frame, the ear 52 is rigidly positioned within the clevis 53 and has been hitched thereto by the pin 55 which has been lowered for this purpose. The position of the member 38 in its nested position has been insured by the retraction of the piston 31 in a conventional manner. As shown in FIG. 2, a further lock of the elements in position can be achieved by providing in the upper and lower walls of the draw bar frame section 39 and the member 38 aligning apertures which receive therethrough a lock pin 66. This latter will of course further inhibit any relative longitudinal displacement of the related parts.

When it is desired to break the hitch, that is to detach the towed implement from the tractor 10, it is merely necessary to swing the handle 64 upwardly, thereby pivoting the disc 62 to raise the hitch pin 55 through the medium of the cable 60 sufficiently to withdraw the pin from the ear 52 and the clevis 53.

When it is desired to receive a further hitch, the operator of the tractor may lift the pin 66 from its locking position, if the same has been utilized, through the medium of a suitably controlled cable 69. Once the lock pin 66 is clear of the hitch member 38, the cylinder 25 may be actuated to project the rod 31. As a result of this, the connected member 38 is pushed rearwardly and outwardly of the draw bar frame section 33, through its rear open ends. In the process, the member 38 carries therewith the pivotally connected stabilizer plate which is adapted to pivot about the curved side wall extensions 43. In the process of projection of the member 38, the rod 47 is pulled outwardly through the aperture 48 in the flange segment 34, bringing the collar 49 into a compressing relation to the spring 51 which exerts a bias of the upper end of the plate 44 tending to maintain its verticle orientation, irrespective of its pivoting in respect to the member 38. The projection of the member 38 is smooth and gradual, the undersurface thereof riding on the roller 37 and the roller 50 projected from its rear end supplements this smooth riding action as it bears on the upper interior wall surface of the member 38. Thus, the apparatus described enables a gentle gravity lowering of the member 38 to a tilted position as shown in FIG. 5, in which position the stabilizer plate 44 is generally perpendicular to the ground surface and the ear 52 is projected generally horizontal and parallel to ground surface. Moreover, at this point, the hitch pin 55 is in a fully retracted position, bearing in its accommodating apertures in the bracket 58.

Thus, as seen, the member 38 is substantially uncontained for a hitching procedure and independently movable up and down in reference to the draw bar frame, the movements of the member 38 being facilitated by the bearing relation of the rollers 37 and 50. Moreover, attention is directed to the fact that a lateral and limited springing movement of the draw bar frame per se may be accommodated. Accordingly, the stabilizer plate and its hitching ear 52 may be variously positioned to accommodate the position of the clevis means 53 of the implement which is to be towed. The means 53 may be at ground level as indicated in broken lines in FIG. 1 or any other position within a wide range of accommodation of the hitch means subscribed. In any case, the operator may readily control the positioning of the stabilizer plate by the plural means provided so that it will be automatically positioned so the tractor may be maneuvered and the ear 52 slipped within the clevis 53, whereupon the operator may swing the handle 64 in the disc 62 from the full line position as shown in FIG. 1 to the position required for hitching as described. The latter is generally indicated, by way of illustration, in broken lines in FIG. 1 of the drawings. With the connection achieved as described, which occurs without involved handling of the apparatus or the implement to be towed, the controls for the cylinder 25 can be operated once more to retract the rod 31 thereof. It will be obvious that on retraction of the rod 31, through the medium of the pin 42 the member 38 is caused to pivot and move on the roller 37 while there is a complemental bearing relation of the roller 50 and the interior upper wall surface of the draw bar frame section 33. The member 38 will be smoothly guided into a retracted nested position as shown in FIG. 2 whereupon the controls 62, 64 will be so positioned to place the handle thereof once more in the reach of the operator of the tractor. In the process, the stabilizer plate has been caused to assume an abutted relation to the rear end of the draw bar frame wherein it is substantially perpendicular to ground surface, the clevis 53 being lifted accordingly and the connected implement properly oriented thereby. This whole function of effecting a connection and properly orienting the towed implement or vehicle is not only smoothly achieved but the same is essentially automatic in operation. Of course, as the stabilizer plate is positioned for towing, the rod 47 is caused to be projected to relieve the compression on the spring 51.

Attention is directed to the fact that while there is a firm connection, the hitch will accommodate a limited pivoting of the towed implement and such displacement will be accommodated to a degree by the limited lateral adjustment permitted by the connection at 17 of the draw bar frame to the tractor.

Substantial components of stress may be generated during the retraction of the apparatus to a towing position and it will be seen that the bearing rollers 37 and 50 are of substantial value in reducing friction and otherwise insuring a smooth, fast and easy retraction of the hitch means into the draw bar frame. As noticed previously, the rod 47 and the spring 51 thereon jointly provides stabilizing means to maintain the hitch plate 44 in a substantially vertical position despite whatever tilting movements of the hitch member 38 may be required. The arrangement is such to facilitate any hitching procedure and the return of the stabilizer plate to its proper position for towing procedures.

As noted above, the lock pin 66 may or may not be utilized. In case it is, a suitable mount 71 may be provided on the frame section 33 to provide a bearing keeper for the pin when it is retracted and not in use. Thus, one may have each supplemental locking means to insure that once the hydraulic mechanism seats the apparatus in a towing position no inadvertent accident will disable the tow connection.

Attention is directed to FIG. 6 which shows a very inexpensive manually controlled hitch means embodying certain features of the automatically acting apparatus above described. Here a basic draw bar 72 for attachment to a tractor frame in the manner similar to the draw bar frame 18 terminates in an outwardly flaring body 73 forming a socket the cavity of which is gradually expanded to its open rearmost extremity. Adapted to nest in the socket provided by the member 73 is a complementary formed hitch device 74. The device 74 is adapted, like member 38, to wedgingly nest, in a retracted position, in the socket provided by the enclosing frame member 73. In this instance a rod 75 is connected to have one end thereof project through an opening 76 in the base of the body 73 and pivotally attach to the inner or reduced end of the hitch means 74. At its outer end of the rod 75 is accessible for manual operation and formed with a bent portion providing a handle portion 77. As may be seen, by manually grasping the handle 77 the rod 75 may be projected inwardly of the inner end of the body 73 and withdrawn therefrom. In this manner and as a result of extending and retracting movements of the rod 75, the hitch means 74 may be selectively projected from and retracted in the body 73. Fixed to bridge the outer end of the body 44, perpendicular to its longitudinal axis is a hitch plate incorporating on its outermost face a perpendicularly projected suitably apertured hitching ear 52'. It will be seen that at the lower and rearmost projected edge of the body 73 forming the socket for the member 74 there is a central slot and means mounting for rotation therein a bearing roller 37'. The latter will serve to smooth the projection and retraction of the body 74 in an obvious manner.

While this last described embodiment does not have the flexibility nor utility of that above described, nevertheless, it does provide a unique concept of a means for simply effecting a hitch for less difficult applications. As is obvious, once the ear 52' is inserted and a hitch clevis 53 on a medium to be towed and a pin is applied to achieve a coupling, one need only draw forwardly on the handle 77 to retract and nest the body 74 in the socket provided by the body 73, the whole being facilitated by the bearing roller 37'. In this practical embodiment of the invention concept there will be a lock pin 78 projectable through aligning apertures in the body 73 and the member 74 when the latter is fully retracted. Thus, the apparatus may be locked in a towing position which will be maintained until one desires to break the hitch by removing the pin 78 and moving the tractor to which the draw bar 72 connects slightly forward of the towed vehicle. The use and application of this simple manual embodiment of the invention concept is believed obvious as well as the fact that its application is intended in respect to towing of elements which may be easily handled and coupled.

Referring again to the preferred embodiment of the invention such as illustrated in FIGS. 1 through 5 and above described, FIG. 7 illustrates a mode of control for projection and retraction of the hitch member 38 other than that provided by the hydraulic cylinder 25 and the associated mechanism including its projected rod 31. As shown in FIG. 7, in this case a lever 79 may be positioned on a tractor chassis for operator adjustment to alternate positions with respect to a mounting bracket 81. A cable anchored at one end to the tractor frame may be caused to ride up and over a pulley-like bearing device mounted to one side of and adjacent the upper end of the lever 79, from which point it is extended downward to pass over an idler pulley 83. From the pulley 83, the cable 82 is extended rearwardly and about a pulley 84 and from therethrough a bracket 85 on a draw bar 86. The latter mounts to the tractor frame in a manner similar to the draw bar frame 18 and terminates at its rearwardly projected extremity in a socket device corresponding in configuration to the frame section 33 and here identified by the numeral 87. Positioning within the socket forming body 87 is a complementary formed hitch means 88 adapted in a retracted position to firmly nest in the body 87. The cable 82 is directed through the forwardmost or base end of the body 87 to attach to the innermost end of the hitch means 88, the connection being similar to that provided between the rod 31 and the member 38. As a result of this connection, it will be seen that with the lever 79 in its uppermost position the cable 82 will be tensioned to pull the hitch device 88 into a retracted and seated position within the body 87. In this embodiment of the invention, to project the hitch means 88 for coupling purposes, a compression spring 89 is provided which is based to one end on the bracket 85 and extends through an opening in the adjacent end of the body 87, bearing against the innermost reduced extremity of the hitch means 88. In the retracted position of the hitch means 88 the lever 79 is anchored by means of suitable detents so that the spring 89 is maintained under compression. When one desires to project the member 88, one merely releases the detent and under the influence of spring means 89 the hitch means will be projected from its nested relation in the housing 87. In this modification of the invention, there may be incorporated in the rear end of the body 87 and rear end of the hitch means 88 suitable bearing rollers to serve functions such as those provided by the roller members 37 and 50 in a first instance. Depending on the applications desired, the hitch means 88 may be of the nature and formations such as represented by the body 74 in FIG. 6 of the drawings or by the member 38 and associated structure in FIG. 5. Of course, if there is to be a pivoted stabilizer plate as preferred, suitable control structure will be provided as described with reference to FIG. 5.

Looking to FIG. 8 of the drawings, there is here simply shown the hydraulic control for the hitch pin labelled as 55 in the embodiment first described. This control would eliminate the need for the linkage including members 61 through 64 inclusive.

In the example of FIG. 8 a hitch plate 91 is shown to pivotally attach to a hitch means 92, the elements corresponding generally to the members 44 and 38. The draw bar frame accommodating the member 92 is designated by the numeral 93. The plate 91, moreover, mounts a projected apertured ear 94 corresponding to the ear 52 and is under the limiting control and stabilizing influence of a rod 103 and spring 104 in the same manner as the hitch plate 44. The ear 94 is adapted for insertion between the jaws of clevis means 95 on a tow bar 96 projected from the implement to be towed. A pin 97 as adapted to be inserted in the aligning apertures in the ear 94 and clevis means 95 to interconnect the parts and in this instance the pin is at the lower end of the rod 98 extensible and retractible in response to hydraulic influences applied to the hydraulic control cylinder 99. The latter contains a piston which is suitably controlled in a conventional manner to project or retract the rod 98 by suitable remote controls in an obvious manner. As shown, the cylinder 99 can be mounted to a plate 91a which is made integral with or otherwise secured to the plate 91. The arrangement is such that the cylinder and its piston rod always orient perpendicular to the ear 94. Pin 97 is thus always properly aligned for insertion or withdrawal as described.

FIG. 9 reveals a further embodiment of the invention wherein a draw bar frame 107 may be of cylindrical or tubular form and the hitch means 108 of conical peripheral configuration may nest in this outer end in a retracted position, with its bottom portion in bearing relation to a roller 109 mounted in a slot in the rearmost lower edge of the tube 107. Fixed in bridging relation to the conical member 108 is a stabilizer plate 105 which in the retracted position bridges the tube 107 at its rearmost extremity and has perpendicularly projected from the center of its outer surface a coupling ear 110. The simple control for the device 108, 105, 110 is a chain 106 which may be paid out to release the member 108 for coupling purposes or retracted to wedgingly nest the hitch member 108 in the rearmost end of the tube 107. As far as the controls refer the chain 106, these may be of any suitable nature. In any event, the embodiment contemplates a condition wherein there has to be a relatively simple and short displacement of the hitch means to position its coupling ear 110 for connection to a member to be towed by a coupling pin.

Common to each of the above described embodiments is the invention concept of relatively nesting elements consisting of a draw bar frame and a hitch means, the latter of which may be smoothly guided to and from a nested retracted towing position in a simple and easy manner.

In summary, the invention provides a most unique concept including the preferred and most flexible embodiment such as represented in FIGS. 1 through 5.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. A draw bar mechanism adapted to provide a substantially rigid connection between a vehicle such as a tractor or the like and a towed means, including a draw bar terminating in a hitch means, with means supporting said hitch means for independent movement to relatively extend and retracted positions, in the former of which it is capable of adjustment for greater flexibility in the making of a connection to the towed means and in the latter of which it is adapted to serve as a rigid part of the draw bar, said draw bar providing a recessed seat to which said hitch means is drawn in a retracted position of the parts, said hitch means having an outer end to dispose in projecting relation to said seat, a hitch plate pivotally connected to the outer end of said hitch means, and means relating said draw bar and said hitch plate to stabilize the position of said hitch plate relative to said hitch means during relative movement of said hitch means in extending and retracting strokes.

2. A draw bar mechanism according to claim 1, characterized by a slidable hitch pin carried by said hitch plate, and remote control means for operating said hitch pin.

3. A draw bar mechanism according to claim 2 wherein said remote control means includes a hydraulic actuator connected to said pin to effect powered actuation thereof.

4. A draw bar mechanism, including a rigid draw bar frame, terminating at one end in an end section having an outer end flaring relatively to an inner end, power means disposed in said frame in a substantially aligned straight-line relation to said end section, a hitch-link member received in said end section and extensible and retractable relatively thereto, an actuating rod pivotally interconnecting said power means and said hitch-link member through the said inner end of said end section, a stabilizing plate pivotally connected to said hitch-link member through the said flaring outer end of said end section, and hitch pin accommodating means on said stabilizer plate.

5. A draw bar mechanism according to claim 4, wherein said hitch-link member is carried between said actuating rod and said stabilizing plate with freedom of pivotal motion relative to both thereof.

6. A draw bar mechanism according to claim 5, wherein said actuating rod is projected substantially in the axis of said draw bar frame to enter said end section through the inner end thereof and within said end section is pivotally attached to said hitch-link member.

7. A draw bar mechanism according to claim 5, characterized by means yieldingly to maintain said stabilizing plate in a predetermined position of angularity relative to said hitch-link member.

8. A draw bar mechanism according to claim 6, wherein said end section and said hitch-like member have complementary box-like configurations, said hitch-like member in a retracted position thereof seating in said end section and in an extending motion tending to tilt relatively to said end section, and anti-friction means carried by said hitch-link member operative in a tilted attitude of said hitch-link member to ride a wall of said end section.

9. A draw bar mechanism according to claim 5, wherein said draw bar frame is adapted for support in underslung relation to a towing vehicle with the other end thereof being constructed for pivotal attachment to such vehicle to provide for a lateral relative swinging motion of said frame.

10. A draw bar mechanism adapted to connect a towing vehicle and a towed means, including a draw bar frame attachable to the towed vehicle, hitch means movably mounted in the outer end of said frame to be extensible and retractable relatively thereto, said hitch means including a relatively adjustable hitch pin, linkage pivotally attached at its one end to said hitch means and adapted at its other end pivotally to attach to the towing vehicle, and remote control means comprised in said linkage for adjusting said hitch pin.

11. A draw bar mechanism according to claim 10, wherein said linkage includes at least a pair of angularly related links and an interconnecting and intermediately disposed disc member, said remote control means including a handle mounted on said disc member and a cable leading to said hitch pin.

12. A draw bar mechanism according to claim 10, wherein said hitch means is extensible to facilitate completion of a hitch, said linkage being connected to said hitch means to be inherently selfadjustable responsive to extension and retraction of said hitch means and positioning said remote control means for adjustment of said hitch pin in any extended or retracted position of said hitch means.

13. A draw bar mechanism adapted to provide a substantially rigid connection between a vehicle such as a tractor or the like and a towed means, including a draw bar terminating in a hitch means, with means supporting said hitch means for independent movement to relatively extended and retracted positions, in the former of which it is capable of adjustment for greater flexibility in the making of a connection to the towed means and in the latter of which it is adapted to serve as a rigid part of the draw bar, said draw bar forming a socket body open at its outer end and having a wall portion inclining toward said outer end, said hitch means being received in said socket body through the open outer end thereof and having a complementary portion which in an extended position is projected from a seat in said socket body and which in a retracted position is returned to a seat therein, reciprocable means extending into said socket body through an inner end thereof and attached to said hitch means in a manner to permit relative tilting movement thereof, and anti-friction means on said hitch means substantially out of contact with said socket body in a retracted position of said hitch means and adapted to engage and to ride said inclined wall portion of said socket body responsive to tilting movement of said hitch means to guide tilting movements of said hitch means.

* * * * *

UNITED STATES PATENT OFFICE
CERTIFICATE OF CORRECTION

Patent No. 3,774,943          Dated November 27, 1973

Inventor(s) Gregory Schmiesing

It is certified that error appears in the above-identified patent and that said Letters Patent are hereby corrected as shown below:

Col. 1, line 52, "retracteid" is amended to read -- retracted --

Col. 3, line 21, "coridngly" is amended to read -- cordingly --.

Col. 5, line 39, "of" is amended to read -- on --.

Col. 6, line 18 "of" (first occurrence) should be amended to read -- on --.

Col. 11, Claim 8, line 2, "hitch-like" is amended to read -- -- hitch-link --;

line 4, "hitch-like" is amended to read -- -- hitch-link --.

Col. 12, Claim 12, line 4, "selfadjustable" is amended to read -- self-adjustable --.

Signed and sealed this 17th day of September 1974.

(SEAL)
Attest:

McCOY M. GIBSON, JR.          C. MARSHALL DANN
Attesting Officer              Commissioner of Patents